(12) United States Patent
Leiser et al.

(10) Patent No.: US 8,904,860 B2
(45) Date of Patent: Dec. 9, 2014

(54) FLUID DETECTION APPARATUS (75) Inventors: Judson M. Leiser, Corvallis, OR (US); Karen A. St Martin, Lebanon, OR (US); Mark A. Devries, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/808,757

(22) PCT Filed: Jul. 12, 2010

(86) PCT No.: PCT/US2010/041653
§ 371 (c)(1),
(2), (4) Date: Jan. 7, 2013

(87) PCT Pub. No.: WO2012/008943
PCT Pub. Date: Jan. 19, 2012

(65) Prior Publication Data
US 2013/0111986 A1    May 9, 2013

(51) Int. Cl.
*G01F 23/00* (2006.01)
*B41J 2/175* (2006.01)
*G01F 23/24* (2006.01)

(52) U.S. Cl.
CPC .............. *B41J 2/17566* (2013.01); *B41J 2/175* (2013.01); *G01F 23/241* (2013.01); *B41J 2002/17579* (2013.01)
USPC ....................................... 73/290 R; 73/304 R (58) Field of Classification Search
CPC .............. B41J 2/17566; A47J 2203/00; C02F 2209/42; G01N 2035/1025; A61M 2205/3389; A61M 2205/3382; A61M 2205/3386; B01D 36/005; B22D 11/186; B22D 11/205; B22D 2/003; B67C 3/2631; D06F 39/087; G01F 23/248
USPC ...... 73/290 R, 290 B, 290 V, 294, 297, 304 C; 101/350, 366; 141/95
See application file for complete search history.

(56) References Cited

U.S. PATENT DOCUMENTS

| | | | |
|---|---|---|---|
| 3,584,643 A * | 6/1971 | Burke ............................ | 137/272 |
| 5,526,026 A * | 6/1996 | Bowers ............................ | 347/6 |
| 5,775,164 A * | 7/1998 | Kishi ........................... | 73/304 R |
| 6,361,136 B1 | 3/2002 | Watanabe et al. | |
| 6,571,624 B1 * | 6/2003 | Grayson et al. ............. | 73/290 R |
| 2006/0137447 A1 | 6/2006 | Usui et al. | |

FOREIGN PATENT DOCUMENTS

EP    0573274    12/1993

OTHER PUBLICATIONS

PCT Search Report—Application No. PCT/US2010/041652 dated Mar. 11, 2011.

* cited by examiner

*Primary Examiner* — Daniel S Larkin
*Assistant Examiner* — Jamar Ray
(74) *Attorney, Agent, or Firm* — Victor DeVito (57) ABSTRACT

Fluid detection apparatus including fluid non-retention members and fluid detection members is disclosed. The fluid non-retention members have concave curved portions having a concavity in an outwardly direction from the respective fluid detection member. The fluid non-retention members are configured to prevent retention of the fluid on at least one of the respective fluid detection members.

20 Claims, 7 Drawing Sheets

FLUID DETECTION APPARATUS

BACKGROUND

Fluid detection apparatuses detect the presence and absence of fluid. Fluid detection apparatuses have been used in printing systems such as printing systems having replaceable ink cartridges. For example, fluid detection apparatuses can detect when the respective ink cartridge has a low ink level and, thus, a user can be notified. Therefore, the user can be provided with an opportunity to change the replaceable ink cartridge and prevent the printing system from running out of ink during a print job.

BRIEF DESCRIPTION OF THE DRAWINGS

Exemplary non-limiting embodiments of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Fluid holding chambers, for example, typically contain fluid to be delivered and used outside thereof. In printing systems, for example, the fluid such as ink may be delivered from the fluid holding chamber to a print ejection unit such as a print head to be used to form images on a media. As the ink continues to get depleted in the fluid holding chamber, if not replaced, exhaustion of the ink therein can result in preventing the formation of images on the media. Refilling and/or replacing the fluid holding chamber at an appropriate time is needed for successful operation of the printing system. Thus, in the present disclosure, examples are provided in which fluid detection members and fluid non-retention members are provided to accurately detect the absence and/or presence of fluid. Such detection can be used, for example, to initiate refilling of the fluid holding chamber in a timely manner or alerting a user of a low fluid condition.

Fluids can have a tendency to climb up and/or along capillaries such as sharp corners, for example, having high surface areas in which the fluid may come in contact. Particularly, fluids such as inks having a low contact angle and a high surface tension. In examples of the present disclosure, fluid non-retention members are configured to prevent fluid from undesirably remaining on and between the fluid detection members as it may result in inaccurate fluid detection. Therefore, in the present disclosure, the fluid non-retention members include concave curved portions having a concavity in an outwardly direction from the respective fluid detection member.

Figure 1A:
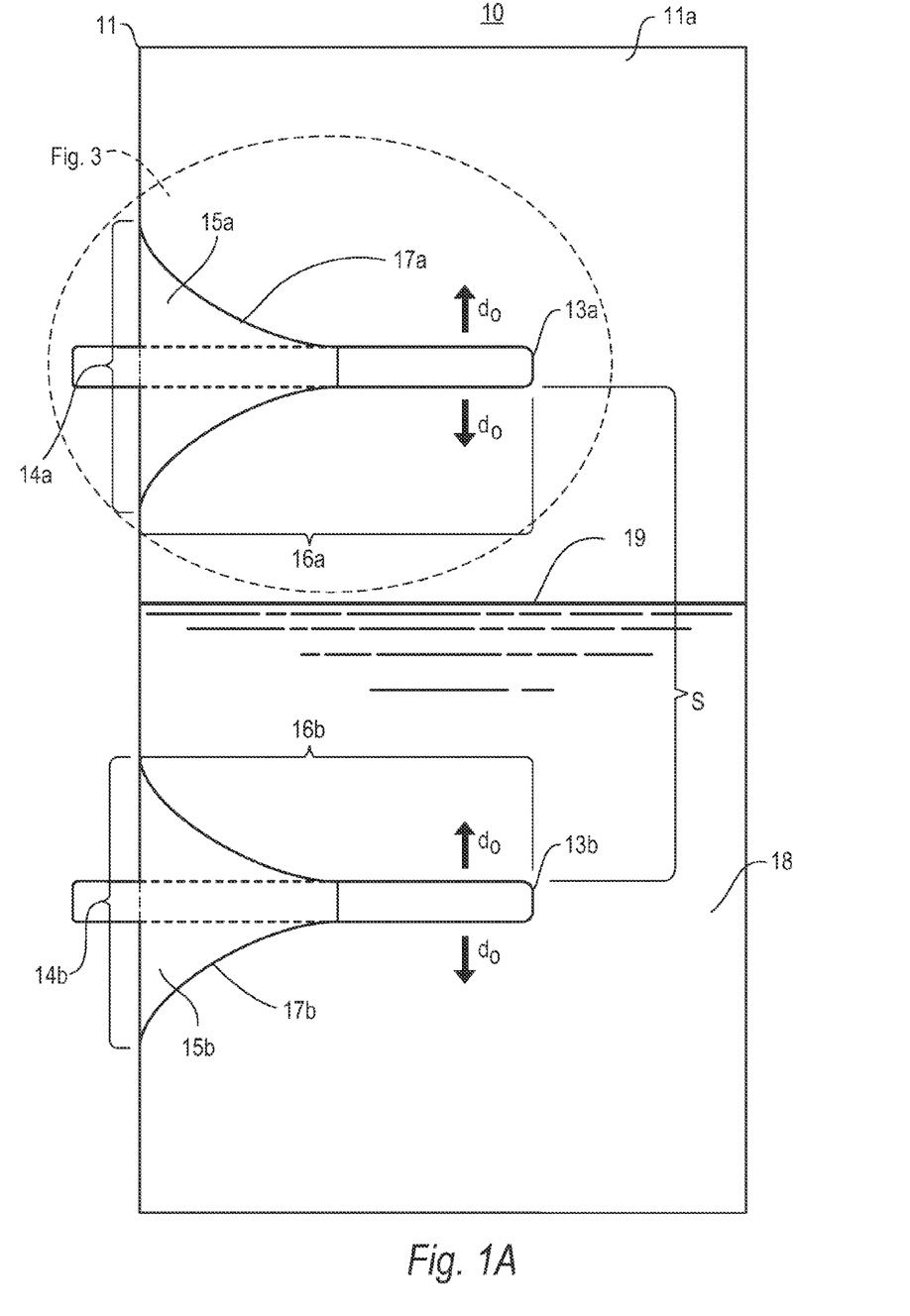
FIGS. 1A and 1B are side views illustrating a fluid detection apparatus in a fluid absence detection state and a fluid presence detection state according to an example of the present disclosure, respectively.
Figure 1B:
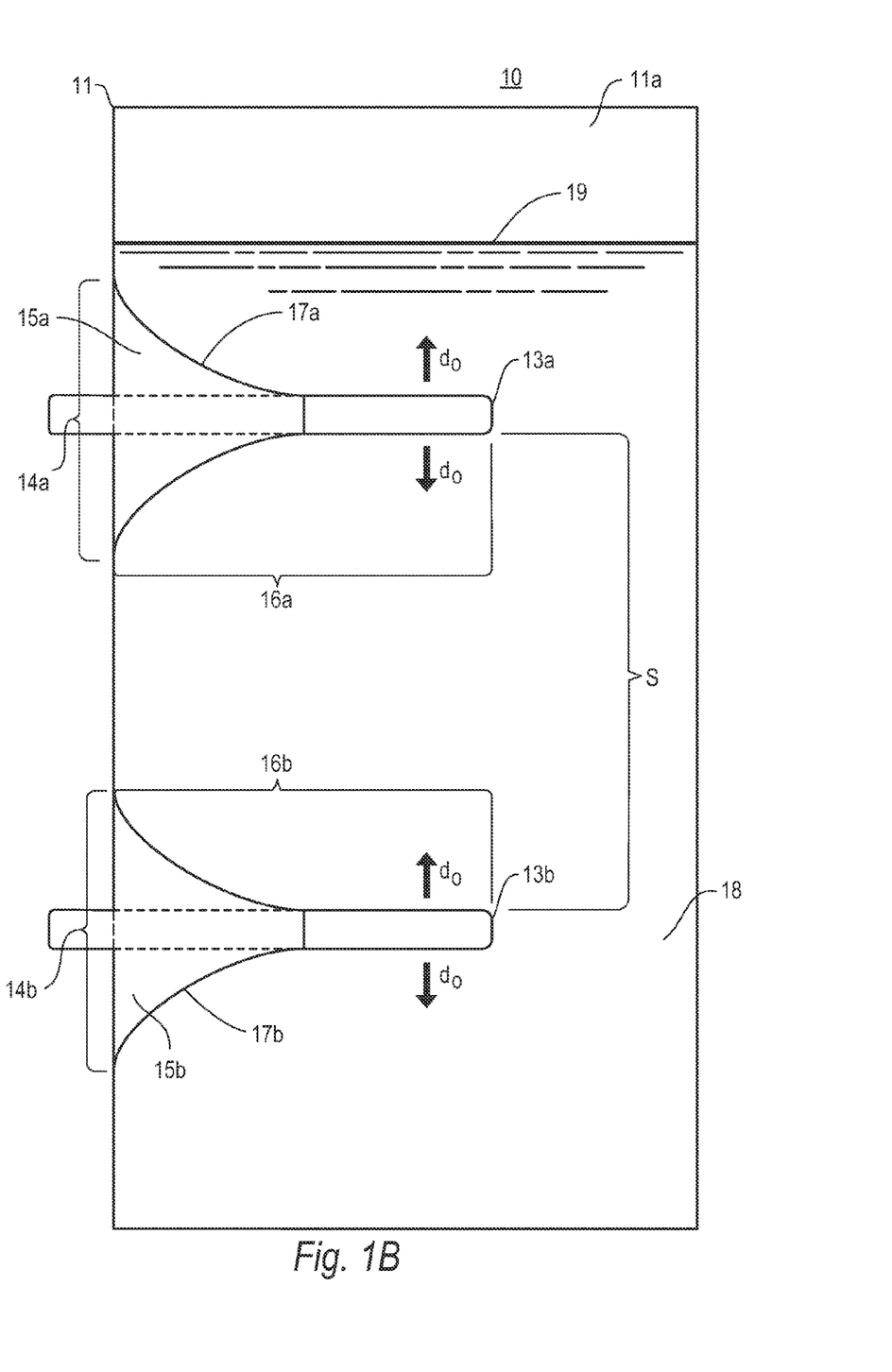

FIGS. 1A and 1B are side views illustrating a fluid detection apparatus in a fluid absence detection state and a fluid presence detection state, respectively, of examples of the present disclosure. Referring to FIGS. 1A and 1B, according to examples of the present example, a fluid detection apparatus 10 includes a fluid holding chamber 11, fluid detection members 13a and 13b, and fluid non-retention members 15a and 15b. The fluid holding chamber 11 includes entry portions 14a and 14b and an interior chamber 11a to hold fluid 18. In an example, an entry portion 14a is an area of the fluid holding chamber 11 proximate to where a respective fluid detection member 13a passes through and/or comes in contact with the fluid holding chamber 11. In the present example, the number of entry portions 14a and 14b corresponds to the number of fluid detection members 13a and 13b. In an example, the fluid 18 may be in the form of ink and the fluid detection apparatus 10 may be in the form of a replaceable or permanent ink supply such as an ink cartridge, an integrated print head, a refillable intermediate ink chamber, or the like. As illustrated in FIGS. 1A and 1B, in the present example, the fluid detection members 13a and 13b include sectional portions 16a and 16b that extend from the respective entry portions 14a and 14b into the interior chamber 11a of the fluid holding chamber 11.

Figure 2A:
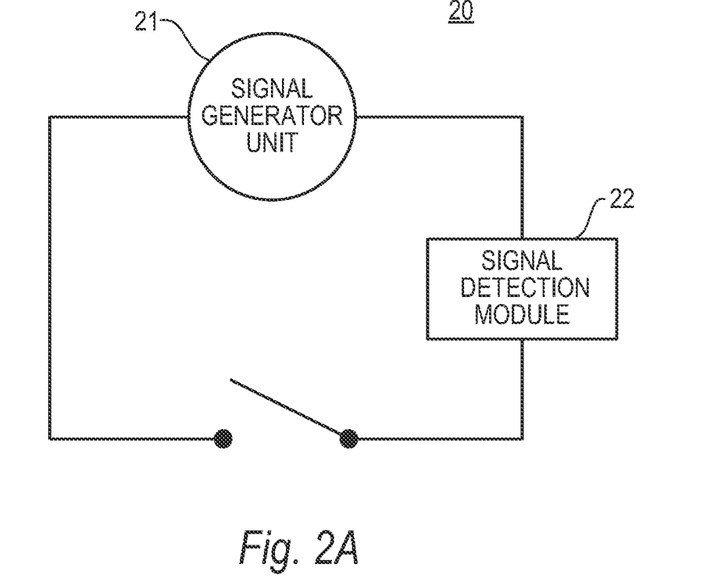
FIGS. 2A and 2B are electrical diagrams illustrating an electrical circuit representation of an electrical circuit in an open state and a closed state, respectively, according to examples of the present disclosure.
Figure 2B:
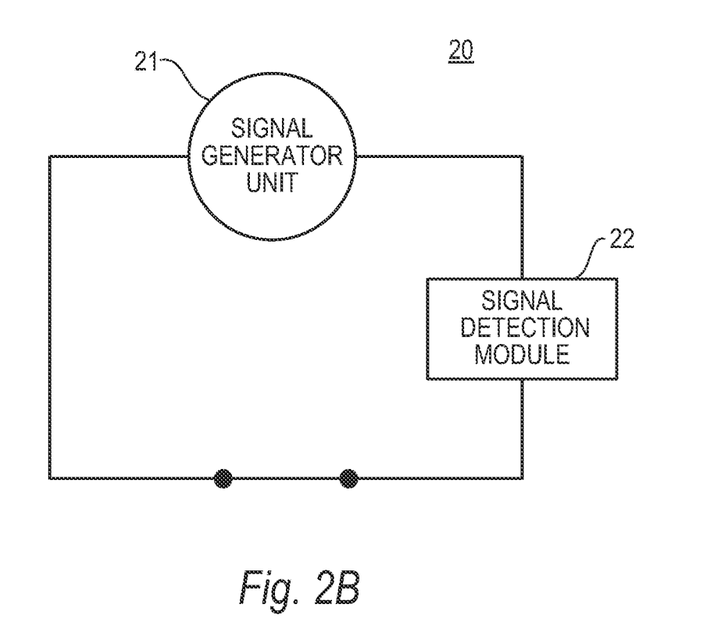

FIGS. 2A and 2B are electrical diagrams illustrating an electrical circuit representation of an electrical circuit in an open state and a closed state, respectively, according to examples of the present disclosure. Referring to FIGS. 1A-2B, in an example, the fluid detection members 13a and 13b may be configured to detect a presence and/or absence of the fluid 18 based on a level 19 of the fluid 18 in the interior chamber 11a. In an example, the fluid detection members 13a and 13b may be in a form of a pair of electrical conductors such as non-corrosive metallic pins, tee posts, electrodes, or the like. For example, one set of ends of the electrical conductors disposed outside of the interior chamber 11a can be connected to each other through leads of an electrical circuit 20 such as a sensing circuit. The other set of ends of the electrical conductors disposed within the interior chamber 11a can be disconnected from each other and arranged across from each other to form a space s in which the fluid 18 can selectively occupy and exit based on the level 19 of the fluid 18 therein.

In the present example, the fluid 18, for example, can act as a transient element to selectively close and open the electrical circuit 20. That is, the fluid 18 can be electrically conductive and, for example, place the electrical circuit 20 in a closed state (FIG. 2B) by electrically connecting the other set of ends of the electrical conductors by occupying the space s formed therebetween. That is, the fluid detection members 13a and 13b detect the presence of the fluid 18 when the fluid 18 is in contact with and extends between each of the fluid detection members 13a and 13b. Alternatively, the fluid 18 can place the electrical circuit 20 in an open state (FIG. 2A) by electrically disconnecting the other set of ends of the electrical conductors by exiting the space s formed therebetween. That is, the fluid detection members 13a and 13b detect the absence of the fluid 18 when the fluid 18 is not in contact with each of fluid detection members 13a and 13b and does not extend between each of the fluid detection members 13a and 13b.

In an example, as illustrated in FIGS. 2A and 2B, the electrical circuit 20 may also include a signal generator unit 21 and a signal detection module 22. The signal generator unit 21, for example, may include a power supply, or the like, to supply a signal such as current through the electrical circuit 20 when the electrical circuit 20 is in a closed state (FIGS. 1B and 2B). In an example, the signal detection module 22 is configured to detect whether a signal is present. For example, the signal detection module 22 may receive the signal from the signal generator unit 21 that passes through each of the fluid detection members 13a and 13b corresponding to the fluid presence detection state (FIGS. 1B and 2B). The signal detection module 22 may include, for example, digital logic circuitry and/or machine-readable instructions. On the other hand, when the electrical circuit 20 is in an open state (FIGS. 1A and 2A), the signal detection module 22 may not receive the signal from the signal generator unit 21 corresponding to the fluid absence detection state. An indicator unit (not illustrated) such as a light, audible alarm, or the like, may be used to indicate the fluid absence detection state (FIGS. 1A and 2A), for example, to a user. Alternatively, the fluid holding chamber 11 may be automatically refilled by an ink supply unit 62 (FIG. 6) in fluid communication with the fluid holding chamber 11 in response to the fluid absence detection state.

As illustrated in FIGS. 1A and 1B, in the present example, the fluid non-retention members 15a and 15b include concave curved portions 17a and 17b. The respective concave portions 17a and 17b have a concavity in an outwardly direction $d_o$ from the respective fluid detection members 13a and 13b. In the present example, the respective concave curved portions 17a and 17b do not include corners having high surface areas in which the fluid 18 may contact and have a tendency to climb up and/or along. Thus, an ability for the fluid 18 to undesirably remain on and between the fluid detection members 13a and 13b resulting in potentially inaccurate fluid detection is reduced, for example, when the level 19 of the fluid 18 in the interior chamber 11a of the fluid holding chamber 11 falls below at least one of the fluid detection members 13a as illustrated in FIG. 1A. That is, referring to FIG. 1A, the fluid non-retention members 15a and 15b are configured to prevent retention of the fluid 18 on at least one of the respective fluid detection members 13a when the fluid holding chamber 11 is in the fluid absence detection state. The fluid absence detection state may correspond to the level 19 of the fluid 18 being below at least one of the fluid detection members 13a. In an example, the fluid holding chamber 11 may also include the fluid presence detection state as illustrated in FIG. 1B. The fluid presence detection state may correspond to the level 19 of the fluid 18 being above the fluid detection members 13a and 13b as illustrated in FIG. 1B. In an example, the fluid non-retention members 15a and 15b are comprised of inert material, or the like.

Figure 3:
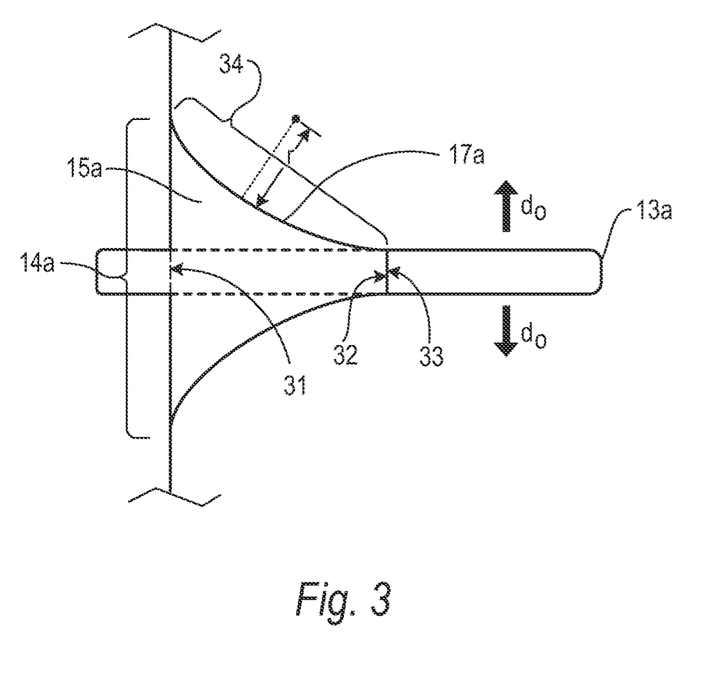
FIG. 3 is an exploded view of a portion of FIG. 1A according to an example of the present disclosure.

FIG. 3 is an exploded view of a portion of FIG. 1A according to an example of the present disclosure. Referring to FIGS. 1A and 3, in an example, the respective fluid non-retention member 15a includes a first end 31 in contact with the respective entry portion 14a of the fluid holding chamber 11, a second end 32 in contact with a transitional portion 33 of the sectional portion 16a of the respective fluid detection member 13a, and a middle section 34 disposed between the first end 31 and the second end 32. In this example, the middle section 34 includes the respective concave curved portion 17a having a radius r in a range of 1 mm to 3 mm. For a variety of fluids, particularly fluids having a low contact angle and a high surface tension, the radius r being in the range of 1 mm to 3 mm. Generally, the radius r having a value under 1 mm for low contact angle, high surface tension liquids may undesirably fill along the middle section 34 of a respective fluid non-retention member 15a and 15b and potentially extend across the fluid detection members 13a and 13b when the fluid level is in the fluid absence detection state. On the other hand, the radius r having a value over 3 mm may generally correspond with distances between the fluid detection members 13a and 13b of 6 mm or more not as prone to capillary creep as distances below 3 mm. The respective concave curved portion 17a may extend from the first end 31 to the second end 32 of the respective fluid non-retention member 15a.

Figure 4A:
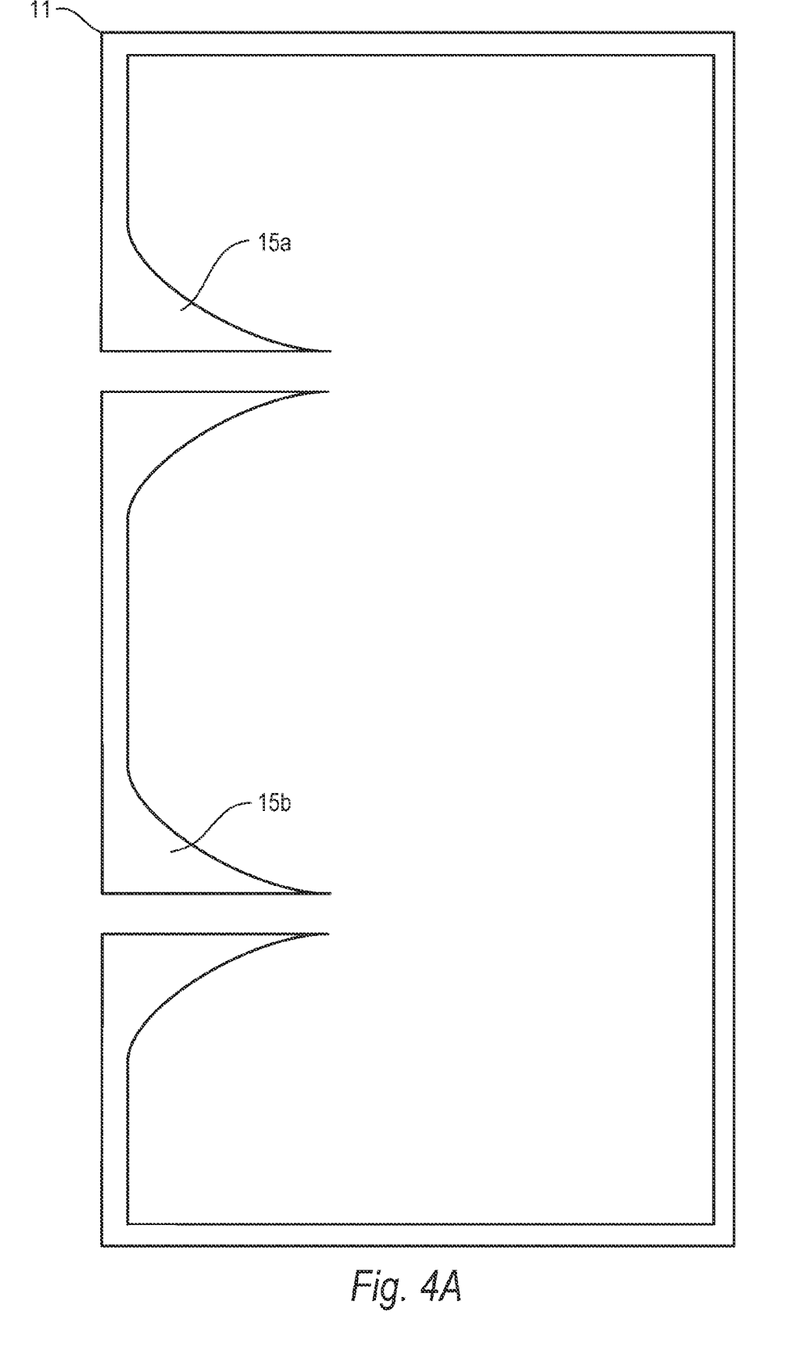
FIG. 4A is a partial side view illustrating a fluid holding chamber including integral fluid non-retention members according to an example of the present disclosure.
Figure 4B:
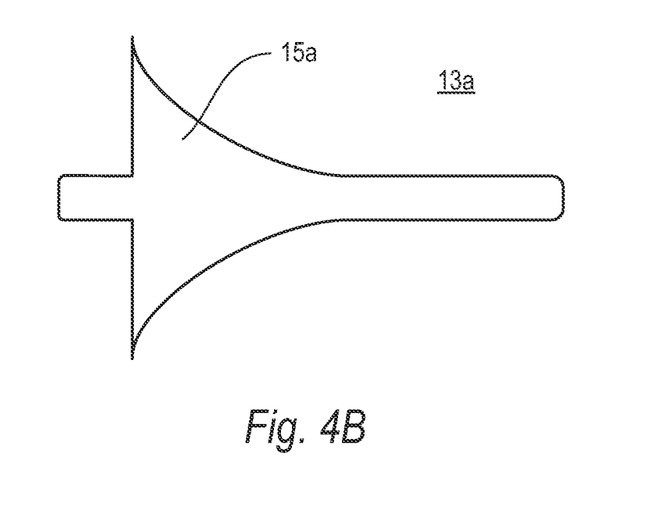
FIG. 4B is a side view illustrating a respective fluid detection member including an integral fluid non-retention member according to an example of the present disclosure.

In an example, the fluid non-retention members 15a and 15b may be integral to the fluid holding chamber 11 as illustrated in FIG. 4A. For example, the fluid retention members 15a and 15b may be formed by an overmold of a portion of the fluid holding chamber 11. In other examples, the respective fluid non-retention member 15a may be integral to the respective fluid detection member 13a as illustrated in FIG. 4B. In the present example, an arrangement between the respective fluid non-retention members 15a and 15b, the entry portions 14a and 14b, and the fluid detection members 13a and 13b can be robust and form a watertight seal between the fluid detection members 13a and 13b and the interior chamber 11a of the fluid holding chamber 11. The mounting of the fluid detection members 13a and 13b may include sufficient rigidity to allow the fluid detection members 13a and 13b to rigidly-maintain a position, for example, in order to withstand a potential shock applied thereto and loads subjected by mating with other components.

Figure 5:
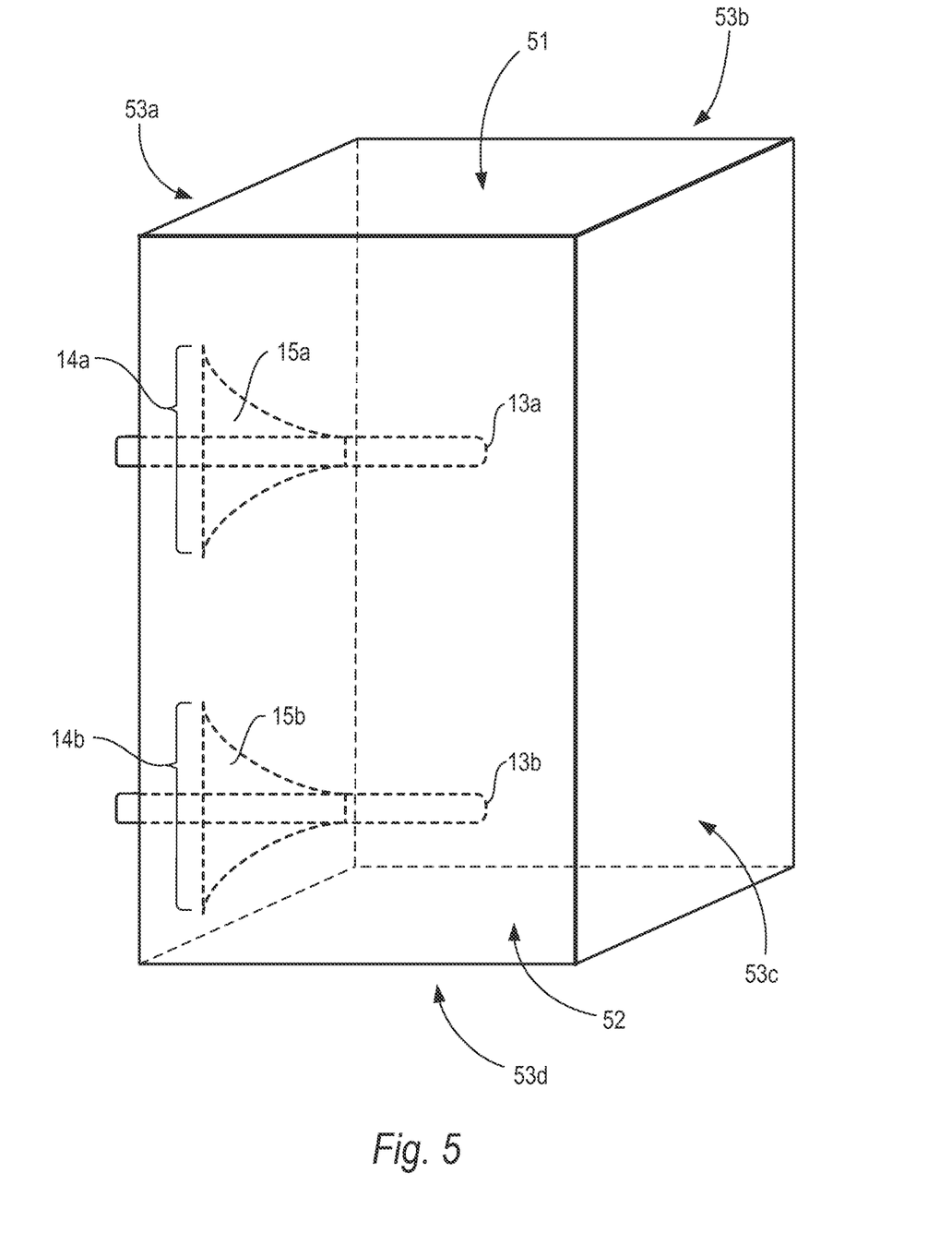
FIG. 5 is a perspective view illustrating a fluid holding chamber according to an example of the present disclosure.

FIG. 5 is a perspective view illustrating the fluid detection apparatus of FIGS. 1A and 1B according to an example of the present disclosure. Referring to FIG. 5, in the present example, the fluid holding chamber 11 of the fluid detection apparatus 10 may include a top portion 51, a bottom portion 52 disposed opposite the top portion 51, and at least one sidewall portion 53a disposed between the top portion 51 and the bottom portion 52 configured to form the interior chamber 11a thereof. In the present example, the fluid holding chamber 11 includes four sidewall portions 53a, 53b, 53c and 53d. For example, as illustrated in FIG. 5, the fluid holding chamber 11 may include two pairs (53a and 53c; 53b and 53d) of sidewall portions such that each sidewall portion of a respective pair is disposed opposite each other forming a generally rectangular shape. The entry portions 14a and 14b of the fluid holding chamber 11 may be disposed on at least one sidewall portion 53a thereof. In another example, the interior chamber 11a may be formed in a generally cylindrical shape by a sidewall portion, or other desired shapes.

Figure 6:
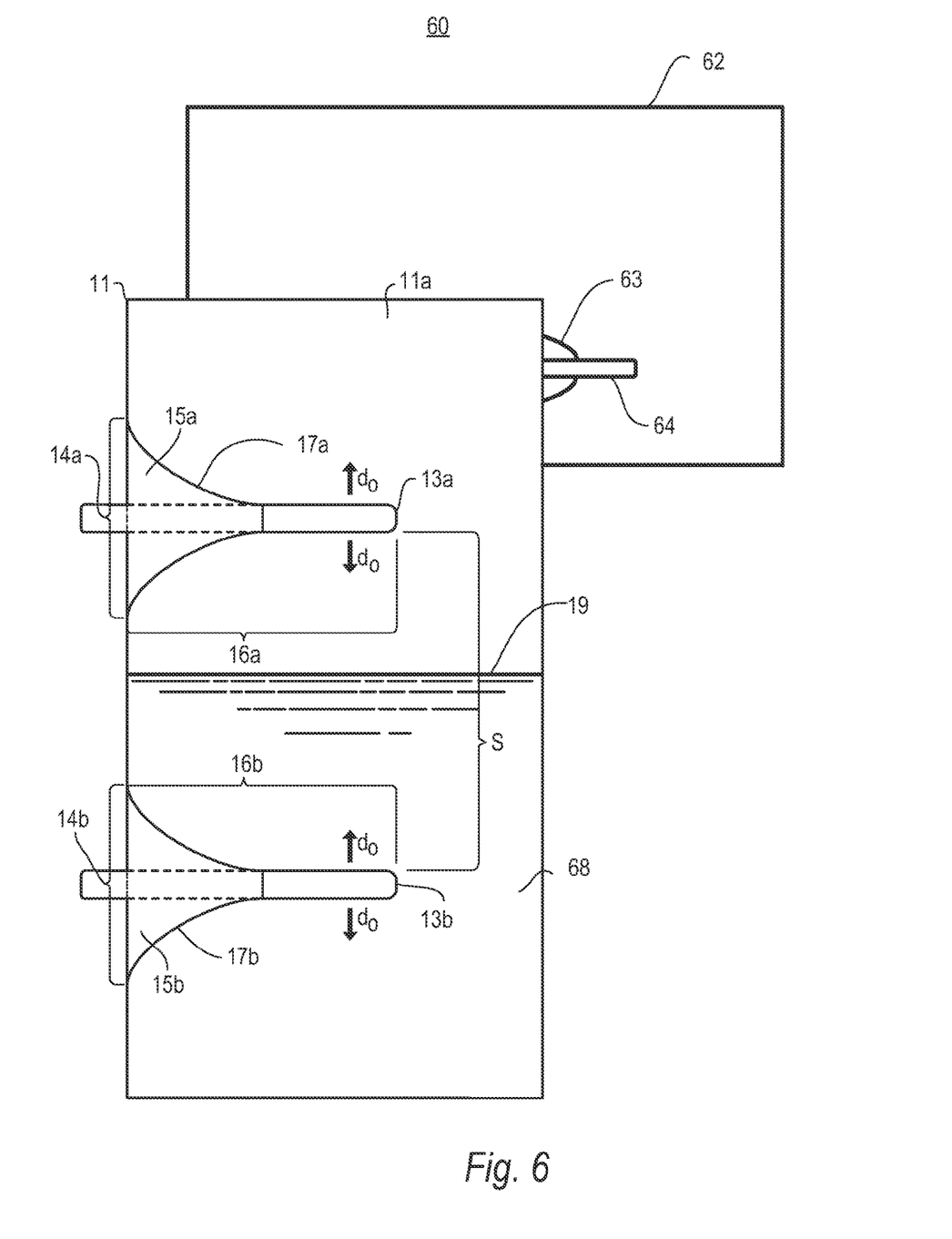
FIG. 6 is a side view illustrating an ink supply system in a fluid absence detection state according to an example of the present disclosure, respectively.

FIG. 6 is a perspective view illustrating an ink supply system according to an example of the present disclosure. Referring to FIG. 6, in the present example, the ink supply system 60 includes a fluid holding chamber 11, fluid detection members 13a and 13b, an ink supply unit 62, and fluid non-retention members 15a and 15b. Referring to FIG. 6, the fluid holding chamber 11 includes entry portions 14a and 14b as illustrated and disclosed previously with respect to FIGS. 1A and 1B and an interior chamber 11a to hold ink 68, the fluid detection members 13a and 13b include sectional portions 16a and 16b extending from the respective entry portions 14a and 14b into the interior chamber 11a of the fluid holding chamber 11, and the fluid detection members 13a and 13b configured to detect at least one of a presence and an absence of the ink 68 based on a level 19 of the ink 68 in the interior chamber 11a.

As illustrated in FIG. 6, the ink supply unit 62 of the ink supply system 60 is in fluid communication with the fluid holding chamber 11. In an example, the ink supply unit 60 may include a septum 63 and the fluid holding chamber 11 may include a fluid interface connector 64 such as a refill needle to engage the septum 63 and establish fluid communication therebetween. Alternatively, the fluid holding chamber 11 may include a septum and the ink supply unit 60 may include a fluid interface connector such as a refill needle to engage the septum and establish fluid communication therebetween. In other examples, the fluid holding chamber 11 and the ink supply unit 60 may be distant from each other and have an elongated tube connected and establishing fluid communication therebetween. The ink supply unit 60 is configured to supply ink to the fluid holding chamber 11, for example, in response to the detection of the absence of ink 68 by the fluid detection members 13a and 13b. In this example, a sufficient amount of ink within the interior chamber 11 is can be maintained by automatically refilling the interior chamber 11a when the level 19 of ink 68 falls below a predetermined amount.

Referring to FIG. 6, the fluid non-retention members 15a and 15b are configured to prevent retention of the ink 68 on the fluid detection members 13a and 13b and extend from the respective entry portions 14a and 14b to the interior chamber 11a. The fluid non-retention members 15a and 15b include concave curved portions 17a and 17b having a concavity in an outwardly direction $d_o$ from the respective fluid detection members 13a and 13b as illustrated and previously disclosed with respect to FIGS. 1A and 1B. In the present example, a radius r of the respective concave curved portion 17a is in a range of 1 mm to 3 mm.

In examples, the fluid holding chamber 11 of the ink supply system 60 may include a fluid absence detection state that corresponds to the level 19 of ink 68 below the at least one of the fluid detection members 13a as illustrated and previously disclosed with respect to FIGS. 1A and 1B. In the present example, the fluid non-retention members 15a and 15b prevent retention of the ink 68 on at least one of the respective fluid detection members 13a when the fluid holding chamber 11 is in the fluid absence detection state. In examples, the fluid holding chamber 11 of the ink supply system 60 may include a fluid presence detection state that corresponds to the level 19 of the ink 68 above the fluid detection members 13a and 13b. In an example, the fluid detection members 13a and 13b detect the presence of the ink 68 when the ink 68 is in contact with and extends between each of fluid detection members 13a and 13b. Additionally, the fluid detection members 13a and 13b detect the absence of the ink 68 when the ink 68 is not in contact with each of fluid detection members 13a and 13b and does not extend between each of the fluid detection members 13a and 13b.

The present disclosure has been described using non-limiting detailed descriptions of example embodiments thereof that are provided by way of example and are not intended to limit the scope of the disclosure. It should be understood that features and/or operations described with respect to one embodiment may be used with other embodiments and that not all embodiments of the disclosure have all of the features and/or operations illustrated in a particular figure or described with respect to one of the embodiments. Variations of embodiments described will occur to persons of the art. Furthermore, the terms "comprise," "include," "have" and their conjugates, shall mean, when used in the disclosure and/or claims, "including but not necessarily limited to."

It is noted that some of the above described embodiments may describe structure, acts or details of structures and acts that may not be essential to the disclosure and which are described as examples. Structure and acts described herein are replaceable by equivalents, which perform the same function, even if the structure or acts are different, as known in the art. Therefore, the scope of the disclosure is limited only by the elements and limitations as used in the claims.

What is claimed is:

1. A fluid detection apparatus, comprising:
a fluid holding chamber having an interior chamber to hold fluid and a plurality of entry portions into the interior chamber;
a plurality of fluid detection members extending through the respective entry portions into the interior chamber, the fluid detection members configured to detect at least one of a presence and an absence of the fluid based on a level of the fluid in the interior chamber; and
a plurality of fluid non-retention members within the interior chamber at the respective entry portions, a respective fluid detection member extending into the interior chamber through a respective entry portion and a respective fluid non-retention member, the fluid non-retention members including concave curved portions having a concavity in an outwardly direction from the respective fluid detection member, the fluid non-retention members configured to prevent retention of the fluid on at least one of the respective fluid detection members when the fluid holding chamber is in a fluid absence detection state,
wherein the fluid absence detection state is based on the level of fluid being below the at least one fluid detection member.

2. The apparatus according to claim 1, wherein the fluid holding chamber further comprises:
a fluid presence detection state based on the level of fluid being above the plurality of fluid detection members.

3. The apparatus according to claim 2, wherein each of the fluid non-retention members comprises:
a first end in contact with the fluid holding chamber at the respective entry portion;
a second end in contact with an intermediate portion of the respective fluid detection member; and
a middle section disposed between the first end and the second end, wherein the middle section comprises the respective concave curved portion having a radius in a range of 1 mm to 3 mm.

4. The apparatus according to claim 3, wherein the respective concave curved portion extends from the first end to the second end of the respective fluid non-retention member.

5. The apparatus according to claim 3, wherein the fluid non-retention members are integral to the fluid holding chamber.

6. The apparatus according to claim 3, wherein the fluid non-retention members are integral to the fluid detection members.

7. The apparatus according to claim 3, wherein the fluid holding chamber comprises:
a top portion, a bottom portion disposed opposite the top portion, and at least one sidewall portion disposed between the top portion and the bottom portion configured to form the interior chamber thereof.

8. The apparatus according to claim 7, wherein the at least one sidewall portion includes two pairs of sidewall portions such that each sidewall portion of a respective pair is disposed opposite each other.

9. The apparatus according to claim 7, wherein the entry portions are disposed on the at least one sidewall portion and the fluid detection members extend through the at least one sidewall portion and the respective entry portion into the interior chamber.

10. The apparatus according to claim 9, wherein the fluid detection members detect the presence of the fluid when the fluid is in contact with and extends between each of the fluid detection members.

11. The apparatus according to claim 9, wherein the fluid detection members detect the absence of the fluid when the fluid is not in contact with each of fluid detection members and does not extend between each of the fluid detection members.

12. The apparatus according to claim 1, wherein the concave curved portions surround the respective fluid detection members.

13. The apparatus according to claim 1, wherein the concave curved portions comprise concave fillets between the respective fluid detection members and the respective fluid non-retention members at the respective entry portions of the fluid holding chamber.

14. The apparatus according to claim 1, wherein the fluid non-retention members form a seal between the respective fluid detection members and the interior chamber at the respective entry portions.

15. An ink supply system, comprising:
a fluid holding chamber having an interior chamber to hold ink and including a sidewall with a plurality of entry portions into the interior chamber;
a plurality of fluid detection members to detect a level of the ink in the interior chamber; and
a plurality of fluid non-retention members to prevent retention of the ink on the fluid detection members,
the fluid detection members extending through the sidewall and into the interior chamber through the respective entry portions and through the respective fluid non-retention members,
the fluid non-retention members forming concave fillet portions between the sidewall of the fluid holding chamber and the respective fluid detection members.

16. The system according to claim 15, wherein the fluid holding chamber further comprises:
a fluid absence detection state during which the level of ink is below at least one of the fluid detection members; and
wherein the fluid non-retention members prevent retention of the ink on the at least one fluid detection member when the fluid holding chamber is in the fluid absence detection state.

17. The system according to claim 16, wherein the fluid holding chamber further comprises a fluid presence detection state during which the level of the ink is above the plurality of fluid detection members.

18. The system according to claim 15, wherein the fluid detection members detect a presence of the ink when the ink is in contact with and extends between each of the fluid detection members, and the fluid detection members detect an absence of the ink when the ink is not in contact with each of fluid detection members and does not extend between each of the fluid detection members.

19. The system according to claim 15, wherein the concave fillet portions extend on opposite sides of a respective fluid detection member.

20. The system according to claim 15, wherein the fluid non-retention members form a seal between the respective fluid detection members and the interior chamber at the respective entry portions.

* * * * *